Figure 1:
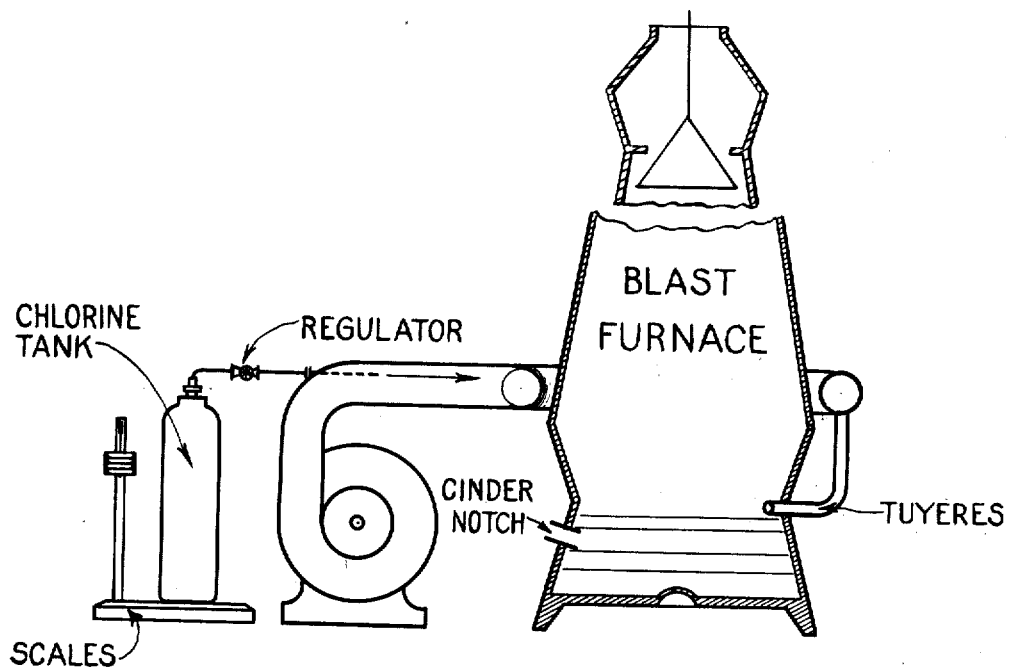

W. L. ESTABROOKE AND D. D. JACKSON.
PROCESS OF DESULPHURIZING IRON ORES, IRON AND STEEL, AND COKE USED IN THE METALLURGY OF IRON.
APPLICATION FILED JULY 13, 1920.

1,426,054.

Patented Aug. 15, 1922.

UNITED STATES PATENT OFFICE.

WILLIAM L. ESTABROOKE, OF YONKERS, AND DANIEL D. JACKSON, OF NEW YORK, N. Y., ASSIGNORS, BY MESNE ASSIGNMENTS, TO JOHN TEELE PRATT, OF NEW YORK, N. Y., DANIEL DANA JACKSON, OF BROOKLYN, NEW YORK, AND JOHN DAVIS SEARS, OF BLOOMFIELD, NEW JERSEY, TRUSTEES.

PROCESS OF DESULPHURIZING IRON ORES, IRON AND STEEL, AND COKE USED IN THE METALLURGY OF IRON.

1,426,054.   Specification of Letters Patent.   Patented Aug. 15, 1922.

Application filed July 13, 1920. Serial No. 395,873.

*To all whom it may concern:*

Be it known that we, WILLIAM L. ESTABROOKE and DANIEL D. JACKSON, residents of Yonkers, county of Westchester, State of New York, and New York city, borough of Brooklyn, county of Kings, State of New York, respectively, have invented certain new and useful Improvements in Processes of Desulphurizing Iron Ores, Iron and Steel, and Coke Used in the Metallurgy of Iron.

This invention relates to a process of treating iron ores, iron and steel, and coke, or other carbonaceous material used in the metallurgy of iron for diminishing the sulphur content thereof, and aims to provide improvements therein.

The presence of sulphur in iron or steel has important effects upon its properties, mostly deleterious.

Most ores of iron contain sulphur, and, in the production of iron or steel, the elimination or diminution of this sulphur is a constant problem, the presence of sulphur having important effects as regards the various processes by which iron or steel is produced, and also having important effects in the carrying on of the several processes. Much greater freedom and simplification of procedure in ore reduction awaits a commercially suitable and practicable manner of treating said ores, or the metal reduced therefrom, for the diminution or elimination of the sulphur content.

Moreover, the repeated use of scrap iron or steel, in the production of iron and steel, is found to effect a gradual rise in the sulphur content of the iron and steel produced, so that the beneficial effect of substances (principally manganese) used to counteract the effect of the presence of sulphur, is being diminished or lost.

Moreover, in the reduction of ores, and in the recarbonizing of iron or steel, the carbonaceous material (coke) used is a source of introduction of sulphur into the iron, and there is occasion for a practical method of eliminating this sulphur from the carbonaceous material.

The present invention provides an improved method of diminishing or eliminating the sulphur content of iron or steel, and of iron ores.

The invention further provides an improved method of eliminating or diminishing the sulphur content of the coke or other carbonaceous material used in recarbonizing, or used in the reduction of the ore, either separately or simultaneously with its use in the blast furnace.

According to the present invention, the iron or steel, or iron ore or coke, is brought into contact with a halogen. Any of the halogens and a variety of halogen compounds may be used to advantage. The compound should be one which will decompose and liberate the halogen at the temperature of the iron or steel mass, or iron ore or coke, undergoing treatment, for example, at the temperatures within a blast furnace, converter, ladle, or the like, though the reaction will take place with many halogen substances at lesser temperatures. The other constituent of the halogen compound is preferably one which volatilizes or enters the slag, or, advantageously, may be such a substance as has a beneficial or desired effect in the process, or in the product, as will be hereinafter more fully explained.

For general purposes, we now regard chlorine as the preferred substance to use, owing to its availability, cheapness, and facility of use.

Various methods of bringing the halogen, or halogen compound, into reactive relation with the sulphur or sulphur compounds of the iron or steel, or ore, may be adopted.

One desirable manner of bringing the halogen or halogen compound into reactive relation with the sulphur or sulphur compound in or of the metal, is to introduce the halogen or halogen compound, in the form of a gas, into a blast furnace along with the air blast, or into a receptacle containing the molten metal, and preferably into the mass of the molten metal, so as to be brought into intimate contact with the molten mass.

In the case of a solid halogen substance, the said compound could be introduced into a blast furnace in the form of a powder, such for example as hypochlorite of lime, along with the air blast, or into the molten iron or steel, by projecting the powder into the receptacle, and preferably into or upon the molten mass of the metal. If desired, the halogen substance could be enclosed within a suitable container, and the latter projected or introduced into the receptacle or furnace containing the molten iron or steel.

The invention further provides a process which may be carried out in a simple manner, and which makes use of halogens or halogen compounds, many of which are in abundant supply in commerce, and low priced, and hence the invention provides a process well adapted for wide commercial utilization.

The present invention further provides a process which enters into established methods and mechanical equipment, without requiring extensive changes.

Reference is made to the accompanying drawing, for facilitating the description and understanding of the process.

Figure 2:
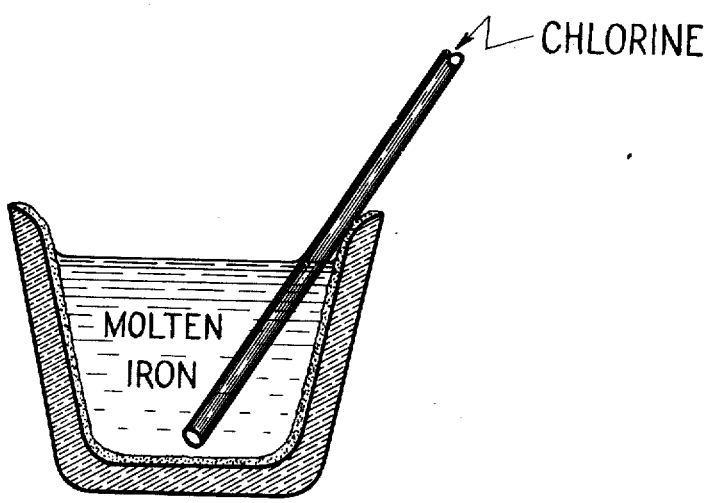

In said drawings:

Figure 1 is a diagrammatic view of a blast furnace, with certain appurtenances, and Figure 2 is a view of a ladle, or the like, containing metal to be treated according to the present process.

In the case of a blast furnace, as diagrammatically shown in Figure 1, it is preferable to introduce the halogen or halogen compound into the furnace in the form of a gas. In this form, the gas can be conveniently mixed with the air which is introduced through the tuyeres into the throat of the furnace. This halogen gas (preferably chlorine), coming in contact with the iron ore and with the molten metal, combines with the sulphur therein, forming sulphur and chlorine compounds, principally sulphur chloride, which reaction products are volatile at the temperature of the furnace or of the molten metal, and pass off with the draft through the stack. If desired, these sulphur compounds may be condensed, usually as a liquid.

The halogen substance may also be introduced into the blast furnace as a powder, such as powdered hypochlorite of lime, along with the air blast. The hypochlorite decomposes within the furnace, releasing chlorine, which attacks the sulphur, and the calcium is free to combine with the phosphorus in the ore or metal, and enter the slag.

It has also been discovered that the halogen or halogen compound acts upon the sulphur contained in the fuel (coke), forming halogen compounds, as, for example, principally sulphur chloride with chlorine, and thus removes the sulphur introduced by the fuel. It follows that the fuel could be treated separately, before introduction into the blast furnace, in order to remove the sulphur content.

The length of treatment of the metal with the halogen or halogen compound, and the quantity of the reagent, will depend upon the amount of sulphur in the ore, fuel, iron or steel undergoing treatment, and the degree to which it is desired to remove the sulphur content.

In the treatment of iron ores in a blast furnace, phosgene gas ($COCl_2$) may be used to advantage. The carbon monoxide will act as a reducing agent upon the ore, and the liberated chlorine will act, as hereinbefore described, to combine with the sulphur in the ore or metal.

The halogen or halogen compound, conveniently in gaseous form, may also be introduced below the surface of the molten iron or steel, as, for example, the molten iron or steel in a converter, ladle, hearth, or the like, as diagrammatically illustrated in Figure 2, through a refractory tube or pipe, as indicated in said figure.

If it is desirable to carbonize the metal, this can be conveniently done, simultaneously with the removal of the sulphur content, by using a halogen compound of carbon, as, for example, one of the carbon chlorides.

The following is a representative result obtained by the use of our process for the removal of the sulphur content of iron, the iron being molten gray cast iron treated with chlorine gas introduced into the molten mass.

| | Before chlorine treatment. | After chlorine treatment. |
|---|---|---|
| Percentage of sulphur in iron | .66% | 5 min. .28% <br> 10 min. .03% |

In the foregoing demonstration, the iron weighed about 500 grams, was contained in a refractory clay crucible, and heated to the molten state. The gas was led beneath the surface of the molten metal through a silicon tube. Similar results have been obtained, working with considerably larger masses of iron.

Iron and steel containing a considerable percentage of sulphur, after treatment with a halogen or halogen compound, according to the present invention, are rendered stronger, less brittle, and more readily and perfectly moulded and machined.

The inventive ideas herein set forth may find expression in a variety of specific procedures.

What is claimed is:—

1. A process of treating iron ores, iron and steel, for diminishing or eliminating the sulphur content thereof, comprising bringing the sulphur or sulphur compounds of said metal into contact with a halogen, whereby a volatile sulphur halide is formed.

2. A process of treating iron ores, iron and steel, for diminishing or eliminating the sulphur content thereof, comprising bringing the sulphur or sulphur compounds of said metal into contact with a halogen, whereby a volatile sulphur halide is formed, said halogen being in the form of an element or compound volatile at the temperature of the metal mass.

3. A process of treating iron ores, iron and steel, for diminishing or eliminating the sulphur content thereof, comprising bringing the sulphur or sulphur compounds of said metal into contact with a halogen, whereby a volatile sulphur halide is formed, said halogen being introduced in the form of a halogen compound volatile and decomposable at the temperature of the metal mass.

4. A process of treating iron ores, iron and steel, for diminishing or eliminating the sulphur content thereof, comprising bringing the sulphur or sulphur compounds of said metal into contact with a halogen, whereby a volatile sulphur halide is formed, said halogen being introduced in the form of a halogen compound, decomposable at the temperature of the metal mass, the non-halogen part of the compound being volatile.

5. A process of treating iron ores, iron and steel, for diminishing or eliminating the sulphur content thereof, comprising bringing the sulphur or sulphur compounds of said metal into contact with a halogen, whereby a volatile sulphur halide is formed, said halogen being introduced in the form of a halogen compound, decomposable at the temperature of the metal mass, the non-halogen part of the compound being volatile, and non-reactive upon the constituents of the metal mass.

6. A process of treating iron ores, iron and steel, for diminishing or eliminating the sulphur content thereof, comprising bringing the sulphur or sulphur compounds of said metal into contact with a halogen, whereby a volatile sulphur halide is formed, said halogen being introduced in the form of a halogen compound, decomposable at the temperature of the metal mass, the non-halogen part of the compounds uniting with a constitutent of the mass.

7. A process of treating iron ores, iron and steel, for diminishing or eliminating the sulphur content thereof, comprising bringing the sulphur or sulphur compounds of said metal into contact with a halogen, whereby a volatile sulphur halide is formed, said halogen being introduced in the form of a halogen compound, decomposable at the temperature of the metal mass, the non-halogen part of the compound having a reducing action upon compounds of the metal.

8. A process of treating iron ores, iron and steel, for diminishing or eliminating the sulphur content thereof, comprising bringing the sulphur or sulphur compounds of said metal into contact with a halogen, whereby a volatile sulphur halide is formed, said halogen being chlorine gas.

9. A process of treating iron ores, iron and steel, for diminishing or eliminating the sulphur content thereof, comprising bringing the sulphur or sulphur compounds of said metal into contact with a halogen, whereby a volatile sulphur halide is formed, said halogen being introduced in the form of a chlorine compound.

10. A process of treating iron ores, iron and steel, for diminishing or eliminating the sulphur content thereof, comprising bringing the sulphur or sulphur compounds of said metal into contact with a halogen, whereby a volatile sulphur halide is formed, said halogen being introduced in the form of phosgene gas.

11. A process of treating iron ores, iron and steel, for diminishing or eliminating the sulphur content thereof, comprising bringing the sulphur or sulphur compounds of said metal into contact with a halogen, whereby a volatile sulphur halide is formed, said halogen being introduced in the form of a carbon-chloride.

12. A process of treating iron ores, iron and steel, for diminishing or eliminating the sulphur content thereof, comprising introducing a halogen substance into a blast furnace, so as to bring the sulphur or sulphur compounds of said metal into contact with a halogen, whereby a volatile sulphur halide is formed.

13. A process for treating iron ores, iron and steel, for diminishing or eliminating the sulphur content thereof, comprising introducing a halogen substance into a blast furnace, so as to bring the sulphur or sulphur compounds of said metal and the sulphur or sulphur compounds of the carbonaceous material in said furnace into contact with a halogen, whereby a volatile sulphur halide is formed.

14. A process for treating iron ores, iron and steel, for diminishing or eliminating the sulphur content thereof, comprising bringing a halogen into contact with carbonaceous material used in the metallurgy of iron and steel.

15. A process of treating iron ores, iron and steel, for diminishing or eliminating the sulphur content thereof, comprising bringing a halogen into contact with ores of iron.

16. A process of treating iron ores, iron and steel, for diminishing or eliminating the sulphur content thereof, comprising introducing a halogen substance into the air blown into a blast furnace, so as to bring the sulphur or sulphur compounds of said metal into contact with a halogen, whereby a volatile sulphur halide is formed.

17. A process of treating iron ores, iron and steel, for diminishing or eliminating the sulphur content thereof, comprising introducing chlorine into a blast furnace, so as to bring the sulphur or sulphur compounds of said metal into contact with chlorine, whereby a volatile sulphur halide is formed.

18. A process of treating iron ores, iron and steel, for diminishing or eliminating the sulphur content thereof, comprising introducing a chlorine-compound, capable of liberating chlorine under the conditions inside of a blast furnace, into a blast furnace, so as to bring the sulphur or sulphur compounds of said metal into contact with chlorine, whereby a volatile sulphur halide is formed.

19. A process of treating iron ores, iron and steel, for diminishing or eliminating the sulphur content thereof, comprising introducing phosgene gas into a blast furnace, so as to bring the sulphur or sulphur compounds of said metal into contact with chlorine, whereby a volatile sulphur halide is formed.

In witness whereof, we have hereunto signed our names.

WILLIAM L. ESTABROOKE.
DANIEL D. JACKSON.

Witnesses:
ADELE M. ERB,
PAULINE W. ERB.

Certificate of Correction.

It is hereby certified that the name of the last-mentioned trustee in Letters Patent No. 1,426,054, granted August 15, 1922, upon the application of William L. Estabrooke, of Yonkers, and Daniel D. Jackson, of New York, N. Y., for an improvement in "Processes of Desulphurizing Iron Ores, Iron and Steel, and Coke Used in the Metallurgy of Iron," was erroneously written and printed as "John Davis Sears," whereas said name should have been written and printed as *Joseph Davis Sears*, as shown by the record of assignments in this office; and that the said Letters Patent should be read with this correction therein that the same may conform to the record of the case in the Patent Office.

Signed and sealed this 3d day of October, A. D., 1922.

[SEAL.]

WM. A. KINNAN,
*Assistant Commissioner of Patents.*